July 22, 1969  F. C. WERNER ET AL  3,456,284
MEAT DEBONER MACHINE
Filed Oct. 10, 1966  3 Sheets-Sheet 1

INVENTORS
FRANK CHARLES WERNER
HAROLD RAYMOND LOGAN
BY
ATTORNEYS

INVENTORS
FRANK CHARLES WERNER
HAROLD RAYMOND LOGAN
BY
ATTORNEYS

July 22, 1969     F. C. WERNER ET AL     3,456,284
MEAT DEBONER MACHINE
Filed Oct. 10, 1966     3 Sheets-Sheet 3

INVENTORS
FRANK CHARLES WERNER
HAROLD RAYMOND LOGAN
BY
ATTORNEYS

United States Patent Office 3,456,284
Patented July 22, 1969

3,456,284
MEAT DEBONER MACHINE
Frank Charles Werner and Harold Raymond Logan, Grand Rapids, Mich., assignors to Werner Machinery Company, Grand Rapids, Mich., a corporation of Michigan
Filed Oct. 10, 1966, Ser. No. 585,662
Int. Cl. A22b 5/00; A22c 17/00
U.S. Cl. 17—1                                                13 Claims

ABSTRACT OF THE DISCLOSURE

A deboning machine for cutting a bone structure from the central portion of a meat cut having an annular grouping of expandable, rotating cutter blades adapted to close around and move along the bone to cut it away from the meat. At the interior of the annular grouping there is provided a rotatable drill which is axially thrustable into the bone. The drill bit, when in inserted position, functions to align and position the bone with respect to the annular cutting elements.

---

This invention relates to a meat deboner machine and, more particularly, to an improvement whereby the particular cut of meat to be deboned may be positively positioned in machines such as those shown in United States Patents Nos. 2,785,434, issued Mar. 19, 1957, and 3,210,801, issued Oct. 12, 1965.

The two patents noted above disclose machines for deboning meat cuts wherein the particular cut to be deboned is positioned on a saddle and slid into contact with an annular group of rotating cutting members which expand and contract according to a predetermined program. The annular group of cutting members has a tubular recess therein into which the bone passes during the cutting operation. In both of these machines, the bone is initially placed at the opening of the annular group and then the saddle upon which the cut is positioned pushed towards the cutting members which are rotating at a relatively rapid rate and, which have their leading edges sharpened in knife-like fashion. As the cut of meat is pushed against the annular group of cutting members, the bone slides into the tubular recess thereof and the meat is forced to the outer periphery of the annular grouping. After the bone has been cut completely free from the meat, the saddle is withdrawn and the meat, minus the bone, removed from the outer periphery of the cutting members. Means are provided for expanding and contracting the annular opening at the leading face of the cutting members during the cutting operation such that bone discrepancies, joints, and the like, which may appear in the particular cut of meat being deboned, may be compensated for.

The two machines disclosed in the patents noted above have not met with a great deal of commercial success because they are not able to positively position the bone within the annular group of cutting members during the separating operation. Each of these machines relies on the bearing of the bone surface against the annular opening of the cutting members to maintain the particular cut of meat in alignment with the tubular recess within the cutting members whereby the meat will be cut evenly at all contact surfaces with the bone. Since the tubular recess within the cutting members must be somewhat larger than the diameter of the bone in order to compensate for joints, knuckles and the like, machines of the type allow the bone to twist away from the axis of rotation of the cutting members and, thus, tend to either gouge into the bone at the cutting point or leave large segments of meat clinging thereto.

It is an object of this invention to provide an improved meat deboning machine which is not subject to the disadvantages outlined above.

More particularly, it is an object of this invention to provide a deboning machine in which the end of the bone drawn into the tubular recess in the cutting apparatus is positively positioned along the axis of rotation of the cutting members.

It is an object of this invention to provide a device of the type described wherein the bore will remain in alignment with the annular cutting surfaces of the cutting member throughout the separating operation.

It is another object of this invention to provide an alignment apparatus for utilization in machines of the general type described wherein positive initial positioning and subsequent separation of the leading bone extremity may be effected quickly and simply and, thus, increased production and reduced operational expenses may be realized.

These and other objects of this invention will be clearly understood by reference to the following specification and accompanying figures in which.

Briefly, this invention comprises a deboning machine having an annular grouping of expandable cutter blades adapted to surround the bone of the particular cut of meat to be deboned and cut the meat therefrom via a sequence of relative movements between the meat cut, the annular blade grouping and the positioning and alignment assembly. More particularly, this invention comprises a bone penetrating and alignment means positioned within and forward of the annular opening in the cutter blade grouping having a member adapted to be selectively thrust into and retracted from the bone. Means are provided for stabilizing the bone during the thrusting operations such that it will not be pushed away from the penetrating and alignment assembly during the penetrating operation.

The apparatus preferably includes means for thrusting the penetrating means, which may comprise a conventional drill, into the meat-cut bone in response to a signal from the operator and for retracting it therefrom at the completion of the particular cutting cycle. These means preferably comprise a shaft having the drill bit mounted on the forward extremity thereof rotatably and slidably supported within an outer sleeve and slidable therein by means of an air cylinder.

Within one aspect of this invention, two sets of rotatable blades are provided, each cutting from opposite directions around the two separate bones to the knuckle of the ham.

Figure 1:
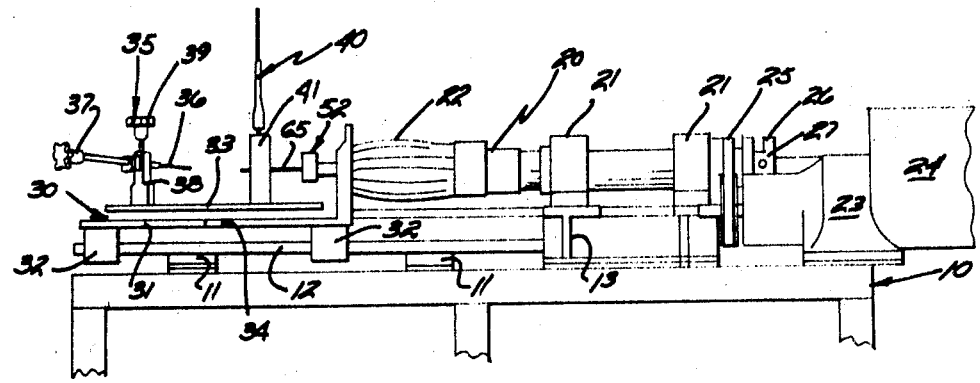
FIG. 1 is a side-elevational view of a deboning apparatus constructed in accordance with the teachings of this invention.
Figure 2:
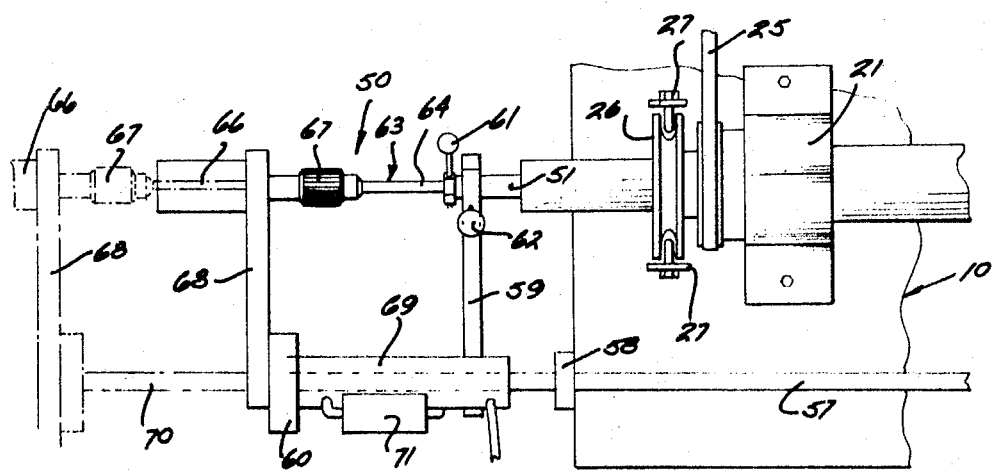
FIG. 2 is a fragmentary, plan view of the rear portion of the penetrating alignment assembly.

Referring initially to FIGS. 1 and 2, the deboning apparatus comprises a base plate 10 having a series of rail supports 11 upon which are mounted a pair of tables slide rails 12. Mounted rearwardly upon base plate 10 from the rail supports is a pillow block mount 13. The cutter assembly, indicated generally by the reference numeral 20, is rotatably borne upon the pillow block mount 13 by a pair of pillow block bearings 21. The cutter assembly comprises a cutter head 22 having an annularly grouping of expandable cutter blades which is adapted to be rotated by a belt 25. The belt 25 is driven by a gear reduction box 23 rotatably connected to a conventional electric motor 24.

Figure 3:
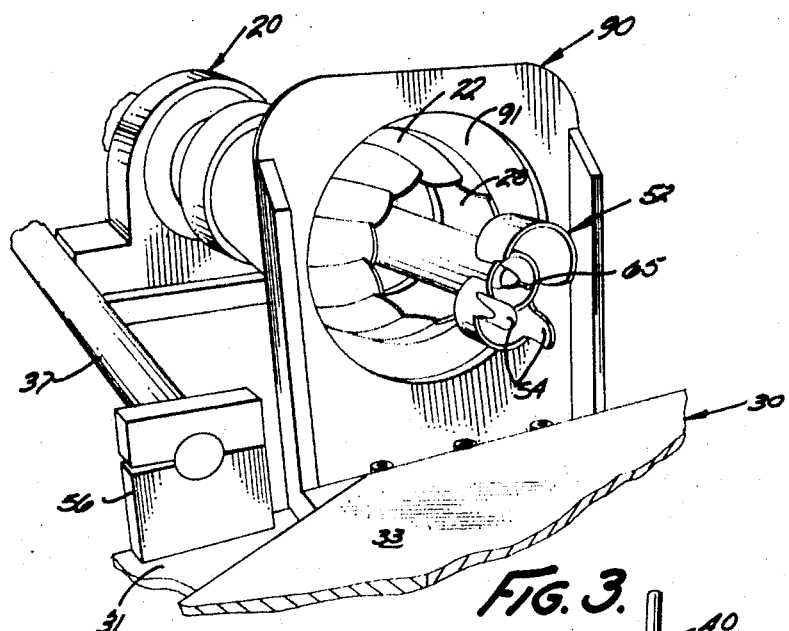
FIG. 3 is a fragmentary perspective view of the cutting and positioning apparatus showing the drill in its retracted position.

The cutter assembly 20 comprises a blade expander 26 adapted to be moved to the left and right as viewed in FIG. 1 by a camming lever assembly 27. Camming lever assembly 27 may be driven by any conventional means such as an air cylinder operable at the operator's command or, alternatively, it may be mechanically or electrically programmed to suit the particular type of meat cuts being deboned. As will be noted by reference to the aforementioned U.S. Patent No. 3,210,801, the movement of blade expander 26 to the left and right, as viewed in FIG. 1, causes the annular opening 28 (see FIG. 3) of the cutter head to open or close such that it may conform to varying bone diameters, knuckle joints and the like. The cutter assembly 20 is well-known in the art and it is not deemed necessary to describe it in more detail.

Forward for the cutter assembly 20 is the table assembly 30 which comprises a base 31 mounted by means of linear bearing 32 for sliding movement to the right and left, as viewed in FIG. 1, upon rails 12. Positioned upon the base 31 is a meat-cut table 33 which, depending upon the particular types of meat cuts to be deboned, may be rotatably mounted with respect to base 31 as indicated at 34. This rotational mount is utilized in the event that a particular cut of meat to be deboned (for example, a ham) contains a bone joint and, thus, necessitates a realignment of the bone with respect to the cutter mechanism after the cut has been partially made. In this particular case, the rotation of table 33 may be pre-programmed by means of electrical or mechanical means or it may be rotated by the operator during the deboning operation.

Figure 4:
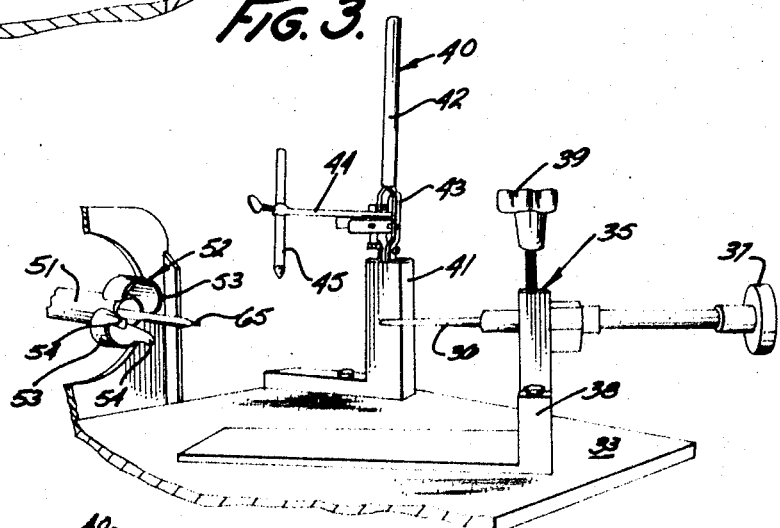
FIG. 4 is a fragmentary perspective view of the meat supporting table.

The cut positioning assembly 35, which positions and retains the meat cut at the extremity most removed from cutter assembly 20, comprises a base member 38 within which is slidably mounted a penetrating element 36 capable of being thrusted inwardly and outwardly as viewed in FIG. 4 by knob 37. A locking knob 39 is provided for securing pentrating element 36 in position once it has penetrated into the bone extremity of the particular cut of meat which is to be processed.

Figure 5:
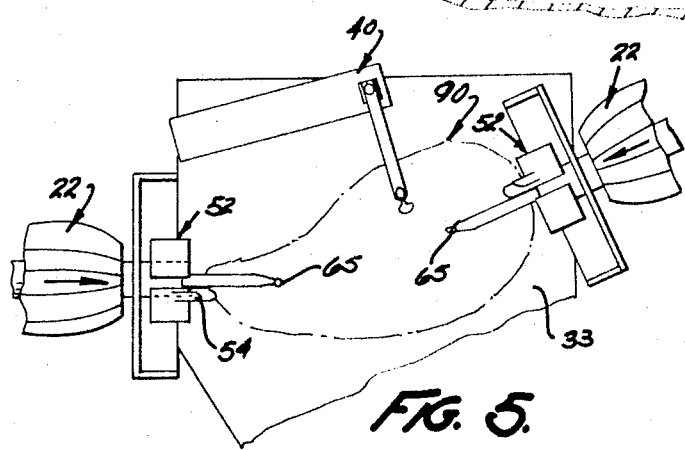
FIG. 5 is a fragmentary plan view of the modified apparatus showing in phantom a ham mounted on the supporting table and cutters arranged to cut from both ends of the bone.

One aspect of this invention is to substitute for the assembly 35 another complete cutting assembly 120 as illustrated by FIG. 5. In this form of the invention another entire cutting assembly 120 is provided including cutter head 122, pillar block bearings 121, grasping assembly 152, drill bit 165, etc. (not shown) all of which function is exactly the same way as assembly 20 (which will subsequently be described in greater detail) the only difference being that the cutter head cuts around the opposite bone of the ham. In this modification, a suitable means is provided for moving the cutting heads into the ham rather than the ham into the cutter heads.

Referring now again to FIGS. 4 and 5, the stabilizer assembly 40 which functions to prevent the cut of meat from rotating during the deboning operation comprises a base 41 having a handle 42 pivotably mounted thereon and adapted to be secured in an up position as indicated in FIG. 4 by means of a position locking mechanism 43. Handle 40 has an arm 44 extending therefrom upon the extremity of which is mounted a stabilizing pin 45. By raising handle 42 to the position shown in FIG. 4, stabilizing pin 45 is rotated downwardly in an arcuate path to penetrate the particular cut of meat being processed. The locking mechanism 43 retains handle 40 in this position until such time as it is grasped by the operator and returned to its original position.

Referring now to FIGS. 2, 3, 4 and 7, the penetrating and alignment assembly which forms one important feature of this invention comprises a sleeve 51 axially centered within cutting assembly 20 by any conventional means such as longitudinal slide bearings or the like. The space within this sleeve is previously proposed deboning machines of this type has been utilized as a channel for sequentially exiting the bones from the machine after they have ben removed from succeeding cuts of meat. Sleeve 51 protrudes beyond the annular opening 28 of cutting head 22 and has mounted on the forward extremity thereof a bone extremity grasping assembly indicated generally by the reference numeral 52. The grasping assembly 52 comprises a pair of arcuate flanges 53. One of these arcuate flanges, as shown best in FIG. 3, has a pair of knuckle retainers 54 extending therefrom.

Figure 7:
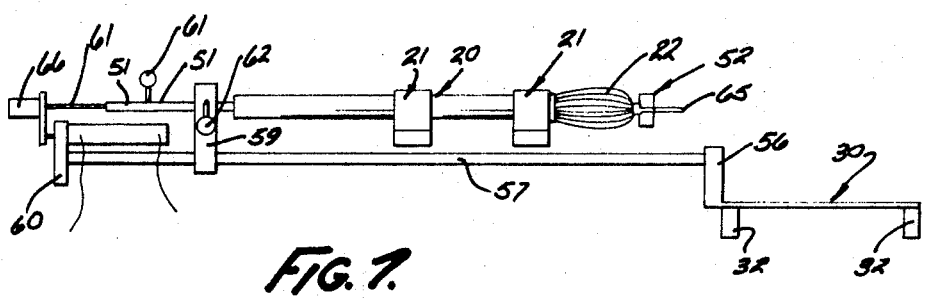
FIG. 7 is a schematic side-elevational view of the penetrating alignment assembly.

The carriage assembly 55, as shown best in FIGS. 2 and 7, comprises a support block 56 mounted directly on table 31 having an elongated tie rod 57 connected directly thereto. The tie rod 57 traverses towards the rear of the machine and is aligned therealong by one or more longitudinal guide bearing members 58 for reciprocable movement. Near the rearward extremity of tie rod 57 is mounted a sleeve support 59. Sleeve support 59 is non-slidably affixed to tie rod 57 and also engages sleeve 51 in selectively non-slidable fashion as will become apparent hereinafter. Mounted at the rear extremity of tie rod 57 and also non-slidably affixed thereto is a cylinder support 60.

Sleeve 51 has a sleeve rotating lever 61 mounted near the rear extremity thereof which, when rotated, is operative to rotate the entire sleeve within cutter assembly 20 so as to position retainer lugs 54 on grasping assembly 52 to receive either a left-hand or right-hand animal meatcut. This arrangement is particularly useful where the meat cuts being deboned are hams since the bone extremities thereof are knuckled in reverse directions depending upon the side of the animal from which the ham originated. When the retainer lugs 54 have been rotated to the desired position by means of lever 61, sleeve support 59 may be non-slidably affixed to sleeve 51 by rotating knob 62 which bears thereagainst in set-screw fashion. Repositioning may be affected, of course, by merely loosening knob 62, rotating lever 61 to the desired position and re-tightening set-screw knob 62.

The drill assembly, indicated generally by the reference numeral 63, comprises a rotatable shaft 64 which is suitably borne, both slidably and rotatably, within sleeve 51. Shaft 64 has a conventional drill bit 65 affixed to the forward extremity thereof and is adapted to be rotated by means of air motor 66 through a conventional engaging chuck 67. Air motor 66 is suspended in the position shown in FIGS. 2 and 7 by means of a support 68 which is affixed to the piston rod 70 of a two-way air cylinder 69. Cylinder 69 is mounted by means of support 60 for movement with tie rod 50.

A conventional flow control 71 (see also FIG. 6) is operatively connected to air cylinder 69. Control 71 permits rapid expansion of the cylinder but limits the speed of retraction thereof to a predetermined lineal rate.

Figure 6:
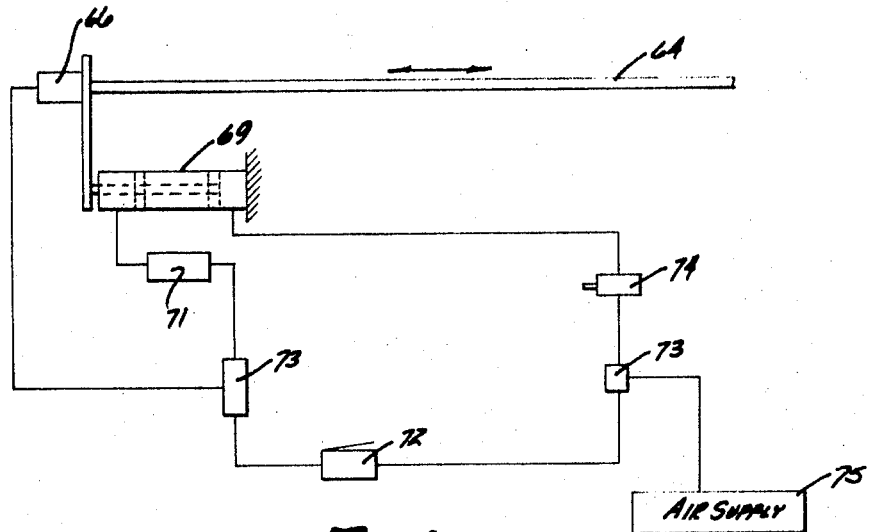
FIG. 6 is a schematic diagram of the air controlled assembly.

Referring now additionally to FIG. 6, the operation of the device will be described. When the machine is inactive, the air cylinder is expanded and its piston rod 70 is positioned as shown in phantom in FIG. 2. Such expansion slides rotatable shaft 64 within sleeve 51 to the left, as viewed in FIG. 2 and, thus, withdraws drill bit 65 to the position shown in FIG. 3. This position allows the knuckle or other extremity of the particular meat cut to be processed to be positioned within grasping assembly 52 by the operator.

Assume, for example, that the cut of meat to be deboned in a ham. The ham knuckle is placed within the grasping assembly as indicated in FIG. 5. Next, pin 36 of cut positioning assembly 35 is thrust into the bone marrow at the opposite end of the cut. Finally, handle 40 is raised to swing spin 45 into the meat cut to prevent rotation thereof. During this time, the weight of the shank end of the ham is borne within arcuate flanges 53 and stabilized by retainer lugs 54.

After the ham has been placed within the saddle in the manner described, the operator activates the penetrating assembly 50 by stepping, for example, on a suitable air switch 72 (see FIG. 6). This pressure activates drill motor 65, causing shaft 64 and the drill bit 65 affixed thereto to rotate within sleeve 51. It additionally activates air cylinder 69 such that support 68, air motor 66 and, thus, shaft 64 and the drill bit 65 mounted therewith move from the position shown in phantom to the position shown in solid in FIG. 2. During this traverse, air motor 66 rotates drill bit 65 continuously and control 71 regulates the speed at which movement occurs. During this period, the bit moves from the position shown in FIG. 3 to the position shown in FIGS. 4 and 5. Since it is rotating, it bores directly into the ham bone and thereafter positively insures the bone's axial alignment with the axis of rotation of the cutting mechanism. It additionally, as will become apparent hereinafter, serves as a bearing surface during subsequent bending of the ham to bring the two bones thereof into alignment preventing twisting of the forward bone.

After the bit is in the position shown in FIG. 5, the table assembly is either pushed or mechanically driven toward cutter assembly along rails 12. As the table begins to move, tie rod 57 causes all of the components of the penetrating and alignment assembly 50 to move with the table. Thus, while the drill bit 65 and the grasping assembly 52 maintain their same relative positions, they both recede into the tubular recess 28 of cutting head 22 as the table is pushed to the right as viewed in FIG. 1. The jaw or annular opening of the cutting head expands and contracts as described previously in order to clear the grasping assembly 52 and to ride closely adjacent all surfaces of the bone during the cutting operation.

When the joint of the ham is encountered, table 33 is rotated either by the operator or by mechanical means about axis 34 above which the joint is centered so as to bring the other section of the ham bone into alignment with drill bit 65 and with the first section of the ham bone. The cutting operation is continued until such time as all of the meat has been cleaned from the bone and is wrapped at the outer periphery of cutting head 22 in expanded fashion. At this point, table assembly 30 is returned to its initial position either manually or mechanically. This movement carries the forward end of sleeve 51, the grasping assembly 52 mounted thereon and the drill bit 65 back to the position shown in FIG. 1. During the return cycle, the meat is pushed from the outer periphery of the cutter head 22 by guard 90 which, in obvious fashion, abuts the radially extending sections of the meat and pushes it off from the cutter head. At the completion of the cycle, trip switch 74 (see FIG. 6) is activated. Such activation may occur, as is well-known in the art, by engagement of a cycling cam surface with the trip switch at the proper moment in the sequential operation. The activation of switch 74 channels the compressed air from supply 75 through junction 73 into the quick return side of double-acting air cylinder 69. This forces piston rod 70 to the expanded position shown in phantom in FIG. 2 and, in turn, causes air motor 66 and shaft 64 to move to the left as viewed in FIG. 2. Such movement retracts drill bit 65 to the position shown in FIG. 3 and, thus, removes the drill bit from the end of the bone. At this point, the cut of meat and the bone are removed from the machine, a new cut placed thereon and the cycle repeated.

The air control circuitry shown in FIG. 6 is merely illustrative of a number of possible circuits, the particular characteristics of which depend on the cycling mechanisms used in a particular embodiment of the apparatus. Preferably, the machine should be mechanically cycled such that the entire sequence, beginning from the time the operator activates switch 72, takes place automatically. Such may easily be accomplished by those skilled in the art. The particular mechanical or manual arrangements which are utilized to rotate saddle 33 and to expand and retract the annular opening 28 in cutter head 22 such that it conforms to variation in the particular bone or the particular class of bones being removed form no part of this invention.

In accordance with the operation of modified apparatus of FIG. 5, the drill bits 65 and 165 are both drilled into opposite bones of the ham to hold the ham in position. Pin 45 is also jabbed into the ham helping to hold the ham in position. Then, cutter head 22 is moved toward the knuckle of the bone and actuated as previously disclosed, causing it to cut around the bone to at least the halfway point of the knuckle. Then it is withdrawn and cutter head 122 is moved and actuated in a manner like that described in relation to head 22. Cutter head 122 cuts along its bone to the halfway point of the knuckle causing the bone to be completely free of the meat. Then drill bits 65 and 165 are withdrawn and the ham removed from table 33. The bone can then be withdrawn from inside the meat.

Thus, it will be seen that this invention has provided a means whereby the leading extremity of the bone which passes initially into the tubular recess in the cutting head may be positively positioned during the removal operation. Such positive positioning enables more accurate programming of the expansion and contraction of the cutter head, insures that the bone will stay in proper axial alignment therewith and, more generally, results in a more efficient deboning operation.

While a preferred embodiment of this invention has been described in detail, it will be apparent to those skilled in the art that many modifications and similar embodiments may be conceived without departing from the spirit of this specification and the accompanying drawings.

I claim:

1. In a deboning machine for cutting a bone structure from the central portion of a meat cut having an annular grouping of expandable cutter blades with a forward opening adapted to surround said bone and cut the meat therefrom and means for initiating relative movement between said meat cut and said grouping whereby said bone passes into said grouping through said opening, the improvement comprising bone penetrating alignment means for penetrating and aligning the extremity of said bone, said alignment means being movably positioned within and forward the opening in said grouping, and means for moving said alignment means relative to said grouping into penetrating engagement with the extremity of said bone to align said bone with respect to said grouping.

2. The device of claim 1 in which one of said annular groupings of cutter blades and one of said alignment means is provided at each end of said bone structure.

3. In a deboning machine for cutting a bone structure from the central portion of a meat cut having an annular grouping of expandable cutter blades with a forward opening adapted to surround said bone and cut the meat therefrom and means for initiating relative movement between said meat cut and said grouping whereby said bone passes into said grouping through said opening, the improvement comprising bone penetrating alignment means for penetrating and aligning the extremity of said bone, said alignment means having a drill mounted on a rotatable shaft extending through said grouping, and means for rotating said shaft and for causing relative movement between said drill and said bone structure.

4. The apparatus as set forth in claim 3 wherein said cutter blades are adapted to rotate and wherein the axis of rotation of said drill coincides with the axis of rotation of said cutter blades.

5. The apparatus as set forth in claim 3 wherein said penetrating alignment means further comprises a sleeve surrounding said shaft having a bone extremity grasping means mounted at the forward end thereof, said shaft and the drill mounted thereon being adapted to selectively protrude from and retract into said sleeve whereby, when said shaft is in its retracted position, said bone extremity may be grasped by said grasping means without interference from said drill.

6. The apparatus as set forth in claim 5 wherein said shaft is operatively supported by reciprocal power means adapted to thrust said shaft within said sleeve such that it selectively protrudes from or retracts into the forward end thereof whereby when said bone extremity has been placed in said grasping means and said drill is rotating and thrust into protruding position with respect to the forward end of said sleeve it will drill into said bone.

7. The combination as set forth in claim 5 wherein said sleeve may be rotated so as to adapt said grasping means to receive bone extremities of meat cuts taken from either side of the animal.

8. The apparatus as set forth in claim 3 wherein said shaft is operatively supported by reciprocal power means adapted to thrust said drill toward and away from said bone, whereby as said drill when rotating is thrusted toward said bone it will drill thereinto.

9. The apparatus as set forth in claim 8 wherein said thrusting movement into said bone occurs prior to any relative movement between said meat-cut and said grouping.

10. The combination as set forth in claim 9 wherein said sleeve, the grasping means affixed thereto; and said drill remain in constant relative position with respect to said bone during said relative movement.

11. The combination as set forth in claim 10 which further comprises a meat cut supporting table adapted to support the bone extremity opposite from that grasped by said grasping means, said table being slidably mounted for movement toward and away from said grouping.

12. The combination as set forth in claim 11 wherein said sleeve, said shaft and said reciprocable power means are slaved to said table for movement therewith, said sleeve and the shaft encircled thereby moving within said grouping.

13. A meat deboning apparatus for meat having two bones arranged at less than a 180° angle with respect to each other and connected together by a knuckle, said apparatus comprising: a grouping of expandable cutter blades adapted to surround each of said bones and cut the meat therefrom, one grouping being located at each free end of said bones; and means for causing movement of each of said groupings toward said knuckle along the axis of the respective bone which it surrounds.

References Cited
UNITED STATES PATENTS

| | | | |
|---|---|---|---|
| 1,435,877 | 11/1922 | Reubold | 17—1.5 |
| 2,785,434 | 3/1957 | Terranova | 17—1.5 |
| 2,893,051 | 7/1959 | Massengill | 17—1.5 |
| 3,210,801 | 10/1965 | Terranova | 17—1.5 |
| 3,248,752 | 5/1966 | Segur et al. | 17—1.5 |
| 3,364,518 | 1/1968 | Brown et al. | 17—1.5 |

LUCIE H. LAUDENSLAGER, Primary Examiner

U.S. Cl. X.R.

17—46